United States Patent Office 3,322,257
Patented May 30, 1967

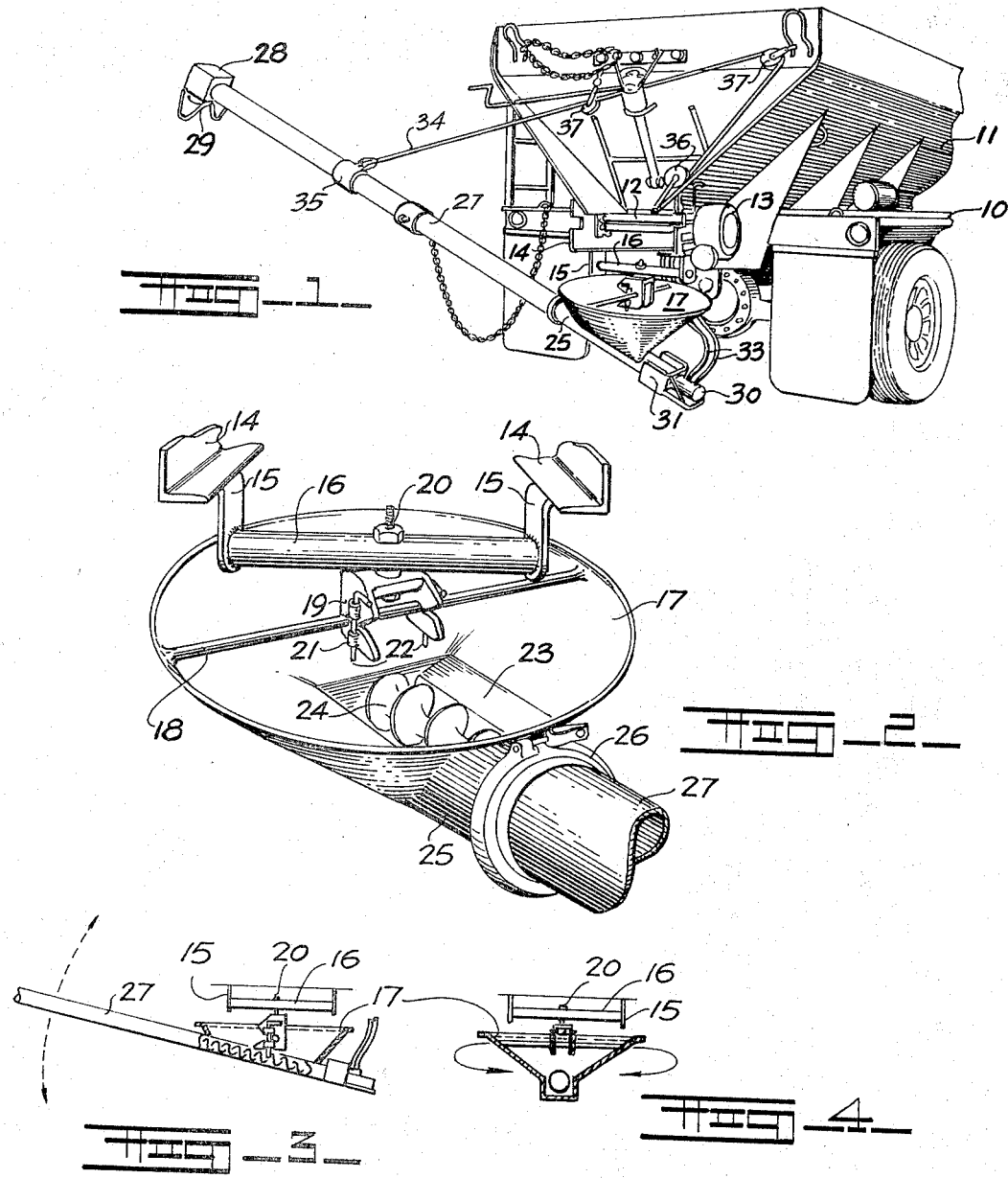

3,322,257
BULK MATERIAL TRANSFER UNIT
Dwight L. Phillips, P.O. Box 224,
Damascus, Ohio 44619
Filed Mar. 16, 1966, Ser. No. 534,914
5 Claims. (Cl. 198—119)

This invention relates to bulk material transfer units and more particularly to such devices including a conveyor mechanism and means for feeding bulk material into the said conveyor mechanism so that it can be transported thereby.

The principal object of the invention is the provision of a truck mounted conveyor mechanism having a universal receiving hopper tiltably and rotatably mounted on said truck.

A further object of the invention is the provision of a bulk material transfer unit incorporating a screw type conveyor and a feeding hopper therefor and means for mounting said conveyor mechanism and feeding hopper in freely movable relation to a supporting object, such as the tailgate of a material transporting vehicle.

A still further object of the invention is the provision of a bulk material transfer unit which may be mounted on a bulk material carrying vehicle so as to receive bulk materials therefrom and convey the same outwardly and upwardly with respect thereto to any one of a number of different delivery points spaced radially and vertically relative to said vehicle.

A still further object of the invention is the provision of a simple, efficient and relative inexpensive conveyor loading device which may be integrally formed with a conveyor and movably positioned relative to a source of materials to be conveyed.

The bulk material transfer unit disclosed herein comprises an improvement in the art relating to truck mounted conveyors which are generally used for handling dry bulk materials, such as lime, fertilizer, feeds, grain and the like and wherein a truck mounted hopper body is arranged to deliver such materials at the tailgate thereof. In conveyor constructions heretofore known in the art a problem has existed with respect to the arrangement and positioning of the conveyor relative to the discharge opening or tailgate of the truck and the several solutions heretofore proposed have required the more or less direct connection of the conveyor with the discharge opening or tailgate of the truck which severely limited the flexibility of the conveyor, particularly with respect to reaching various elevations and various points radially spaced with respect to the discharge opening or tailgate of the truck. The present invention relates specifically to a conveyor having a receiving hopper of a novel configuration and size and including means for suspending the conveyor centrally and vertically of said receiving hopper so that the receiving hopper and conveyor may be tilted or rotated relative to the point of suspension thereof and still maintain a desirable material receiving position at all times.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of the rear portion of a bulk material transporting vehicle and a conveyor movably positioned thereon.

FIGURE 2 is an enlarged detailed perspective view showing the receiving hopper of the conveyor and the suspension means therefor.

FIGURE 3 is a schematic diagram illustrating the tilting capabilities of the unit.

FIGURE 4 is a diagrammatic view illustrating the rotatable capabilities of the unit.

By referring to the drawings and FIGURE 1 in particular, it will be seen that the rearmost portion of a vehicle 10 having a bulk material hopper body 11 thereon has been illustrated. The hopper body 11 has a belt conveyor 12 built in the lower portion thereof and extending to a discharge opening at the rear of the body 11. A fluid motor 13 mounted on the rear portion of the body 11 supplies motion for moving the conveyor belts 12 as will be understood by those skilled in the art. The body 11 includes spaced parallel frame members 14, one of which supports the fluid motor 13 and both of which are provided with a downwardly extending bracket 15. A transverse tubular member 16 is positioned between the brackets 15 and directly below the discharge point of the conveyor belt 12.

By referring now to FIGURES 1 and 2 of the drawings it will be seen that the conveyor suspended below the tubular member 16 and pivotally with respect thereto includes a conical hopper 17 having a transverse supporting bar 18 across its uppermost open end. A bifurcated jaw 19 is shown engaged on the transverse bar 18 and is in turn rotatably secured to the tubular member 16 by a pivot member 20. The bifurcated jaw has horizontally disposed vertically spaced portions engaged on the transverse bar 18 and loop formations 21 on the outer sides of the bifurcated jaw 19 receive removable pins 22 which act to prevent the transverse bar 18 from moving outwardly of the bifurcated jaw 19. The bottom of the conical hopper 17 has an angularly disposed rectangular opening 23 therein which communicates with a screw positioning chamber in which a conveyor screw 24 is positioned. A tubular member 25 positioned below the rectangular opening 23 encloses the conveyor screw 24 and the same extends outwardly to a coupling 26 to which additional tubular sections 27 are attached. Those skilled in the art will observe that the tubular sections 27 and the conveyor screw 24 may be of any desired length and that they are provided at their outermost or discharge end with a member 28 which supports the end of the conveyor screw 24 and provides a right angular discharge opening 29. In order that the conveyor screw 24 may be rotated so as to convey materials deposited in the conical hopper 17 upwardly through the tubular conveyor a fluid motor 30 as best seen in FIGURE 1 is mounted on a frame member 31 forming an end closure of the tubular member 25 heretofore referred to. The fluid motor 30 is in axial alignment with the conveyor screw 24 and is connected directly thereto. Fluid supply hoses 33 extend from the fluid motor 30 to a fluid pump on the vehicle 10 as will be understood by those skilled in the art.

By referring now to FIGURE 3 of the drawings, a symbolic diagram will be seen in which the bulk material transfer unit is positioned with the upper open end of the conical hopper 17 in spaced parallel relation to the tubular member 16 by which it is suspended on the vehicle 10. It will be seen that the engagement and positioning of the transverse bar 18 which is part of the conical hopper 17 is such that the tubular conveyor sections 27 may be moved vertically in an arc based on the transverse bar 18 and as shown by the broken lines and arrows in FIGURE 3.

By referring now to FIGURE 4 the bulk material transfer unit will be seen to be illustrated in a relatively different position from that illustrated in FIGURE 3 and by reason of the ability of the entire unit to rotate on the pivot member 20. In both FIGURES 3 and 4 it will be observed that regardless of the positioning of the device the conical hopper 17 will still be in desirable position for receiving bulk materials delivered thereinto.

By referring again to FIGURE 1 of the drawings it will be observed that the tubular member 25 is positioned at an angle relative to the upper open end of the conical hopper 27 of the device and that the tubular conveyor sections 27 extend outwardly on the same angle as the tubular member 25 and are in fact coupled thereto by a quick detachable coupling 26 which may be any one of a number of such couplings that are suitable for such purpose. The tubular conveyor sections 27 are held in elevated angular relation as shown in FIGURE 1 by a supporting cable 34 one end of which is attached to a collar 35 engaged on one of the tubular conveyor sections 27 and the other end of which is engaged on a winch 36 mounted on the hopper body 11 heretofore described. The cable 34 passes through a pair of pulleys 37 which are adjustably attached to the upper portion of the hopper body 11 and it will thus be observed that the tubular conveyor sections 27 can be supported at any desired angle in any radial position relative to the conical hopper 17 and that material discharged into the conical hopper 17 will thus be fed directly into the conveyor and moved by the conveyor screw 24.

It will thus be seen that a bulk material transfer unit has been disclosed which may be readily attached to and detached from a relatively simple mounting on a hopper body of a vehicle so that its novel conical receiving hopper is in desirable position for receiving material from the hopper body of the vehicle at all times regardless of the angle of elevation of the conveyor or its radial positioning relative to said hopper body.

It will thus be seen that a bulk material transfer unit has been disclosed which meets the several objects of the invention and having thus described my invention, what I claim is:

1. A bulk material transfer unit for use with a bulk material carrier having a discharge opening and support means below said discharge opening for holding one end of said bulk material transfer unit, said bulk material transfer unit including conveyor means having a receiving hopper on said one end thereof, said receiving hopper comprising a relatively large conical member disposed in angular relation to said conveyor unit and communicating therewith, a transverse bar on said conical member, a freely rotatable member mounted on said support means and pivotally attached to said transverse bar on said hopper and means for imparting motion to said conveyor means.

2. The bulk material transfer unit set forth in claim 1 and wherein said conveyor means comprises an elongated tubular member, a conveyor screw disposed in said tubular member and extending beneath said receiving hopper.

3. The bulk material transfer unit set forth in claim 1 and wherein said transverse bar on said conical hopper is located at the uppermost end thereof and extends across the center thereof.

4. The bulk material transfer unit set forth in claim 1 and wherein the conical member comprising the receiving hopper has a open end diameter greater than the width of said discharge opening and said support means therebelow.

5. The bulk material transfer unit set forth in claim 1 and wherein said means for imparting motion to said conveyor means comprises a fluid motor mounted on said receiving hopper and operatively connected with said conveyor means.

References Cited
UNITED STATES PATENTS

| | | | |
|---|---|---|---|
| 881,295 | 3/1908 | Bradford | 198—119 X |
| 2,675,932 | 4/1954 | Potter | 214—83.26 |
| 2,797,028 | 6/1957 | Stoltzfus | 198—119 X |
| 3,145,855 | 8/1964 | Plugge et al. | 198—64 X |

EVON C. BLUNK, *Primary Examiner.*

R. L. HICKEY, *Assistant Examiner.*